US011054930B2

(12) United States Patent
Nam et al.

(10) Patent No.: US 11,054,930 B2
(45) Date of Patent: Jul. 6, 2021

(54) ELECTRONIC DEVICE AND OPERATING METHOD THEREFOR

(71) Applicant: Samsung Electronics Co., Ltd., Gyeonggi-do (KR)

(72) Inventors: Seung Wook Nam, Gyeonggi-do (KR); Youngmi Kim, Seoul (KR); Youngseong Kim, Seoul (KR); Hyo-Sang Bang, Seoul (KR); Sangsu Lee, Daejeon (KR); Youngjay Lee, Gyeonggi-do (KR); Jae Myoung Lee, Seoul (KR); Kyungsoo Lim, Gyeonggi-do (KR); Soe-Youn Yim, Seoul (KR); Martin Jung, Seoul (KR); Jinhoon Cho, Gyeonggi-do (KR); Hyunyeul Lee, Seoul (KR); Jongmoo Lee, Seoul (KR); Seung-Min Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/311,416

(22) PCT Filed: Jun. 7, 2017

(86) PCT No.: PCT/KR2017/005894
§ 371 (c)(1),
(2) Date: Dec. 19, 2018

(87) PCT Pub. No.: WO2018/004140
PCT Pub. Date: Jan. 4, 2018

(65) Prior Publication Data
US 2019/0235687 A1 Aug. 1, 2019

(30) Foreign Application Priority Data
Jun. 28, 2016 (KR) .................. 10-2016-0081215

(51) Int. Cl.
*G06F 3/041* (2006.01)
*G06F 3/0484* (2013.01)
*G06F 3/0488* (2013.01)

(52) U.S. Cl.
CPC ............ *G06F 3/0414* (2013.01); *G06F 3/041* (2013.01); *G06F 3/0484* (2013.01); *G06F 3/0488* (2013.01); *G06F 2203/04105* (2013.01)

(58) Field of Classification Search
None
See application file for complete search history.

(56) References Cited

U.S. PATENT DOCUMENTS 8,633,916 B2    1/2014  Bernstein et al.
2006/0197753 A1 9/2006  Hotelling
(Continued)

FOREIGN PATENT DOCUMENTS

KR    20070110114   11/2007
KR    101457351    11/2014
(Continued)

OTHER PUBLICATIONS

PCT/ISA/210 Search Report issued on PCT/KR2017/005894 (pp. 9).
PCT/ISA/237 Written Opinion issued on PCT/KR2017/005894 (pp. 7).

*Primary Examiner* — Nitin Patel
(74) *Attorney, Agent, or Firm* — The Farrell Law Firm, P.C.

(57) ABSTRACT

Disclosed in various examples of the present invention are a method and a device for enabling a system function using a system button to be used according to a user input, when displaying a picture related to an application through the entire area of a display without displaying a system button (provided transparently or translucently). According to various examples of the present invention, an electronic device (Continued)

comprises a display, a memory, and a processor electrically connected to the display and the memory, wherein the processor can be configured so as to sense, on the display, a user input through a touch region including the system button, identify the user input, and execute a system function by means of the system button or an application function according to the user input in the touch area including the system button. Various examples are possible.

10 Claims, 8 Drawing Sheets

(56) References Cited

U.S. PATENT DOCUMENTS

| | | | | |
|---|---|---|---|---|
| 2008/0163082 | A1* | 7/2008 | Rytivaara | G06F 3/04886 |
| | | | | 715/762 |
| 2009/0225035 | A1* | 9/2009 | Baik | G06F 3/04886 |
| | | | | 345/173 |
| 2012/0105358 | A1 | 5/2012 | Momeyer et al. | |
| 2012/0274574 | A1* | 11/2012 | Aono | G06F 3/0488 |
| | | | | 345/173 |
| 2014/0365944 | A1* | 12/2014 | Moore | G06Q 30/0261 |
| | | | | 715/772 |
| 2015/0015500 | A1* | 1/2015 | Lee | G06F 3/044 |
| | | | | 345/173 |
| 2015/0143234 | A1* | 5/2015 | Norris, III | G06F 17/24 |
| | | | | 715/256 |
| 2016/0018891 | A1 | 1/2016 | Levesque et al. | |
| 2017/0083096 | A1* | 3/2017 | Rihn | G06F 3/0416 |
| 2018/0059893 | A1* | 3/2018 | Xu | G06F 3/0416 |
| 2018/0260803 | A1* | 9/2018 | Seol | H04M 1/7253 |
| 2018/0314362 | A1* | 11/2018 | Kim | G06F 3/04883 |

FOREIGN PATENT DOCUMENTS

| | | |
|---|---|---|
| KR | 20150009046 | 1/2015 |
| KR | 20160008301 | 1/2016 |
| KR | 20160011148 | 1/2016 |

* cited by examiner

ELECTRONIC DEVICE AND OPERATING METHOD THEREFOR

PRIORITY

This application is a National Phase Entry of International Application No. PCT/KR2017/005894, which was filed on Jun. 7, 2017, and claims priority to Korean Patent Application No. 10-2016-0081215, which was filed on Jun. 28, 2016, the contents of each of which are incorporated herein by reference.

TECHNICAL FIELD

Various embodiments of the present disclosure relate to a method and an apparatus which distinguish between a function by means of a system and a function by means of an application according to a type of user input in an electronic device, and process the functions.

BACKGROUND ART

With the recent enhancement of digital technology, various types of electronic devices such as mobile communication terminals, smart phones, tablet personal computers (PCs), notebook PCs, wearable devices, or the like are widely used.

An electronic device provides at least one system button (or key) for immediately executing a specific function. The system button may include, for example, a button for immediately executing a function, such as a recent list viewing function, a home screen returning function, a previous screen returning function, or the like. The system button may be separately provided on a bezel of an electronic device as a physical (or hardware) button, or may be provided inside a display (or screen) of an electronic device as a software button according to a type of an electronic device, and may be provided to operate according to a touch input.

In the case of an electronic device that provides a system button through a certain region (for example, a lower end region of a display) of a display, the electronic device provides a full screen on the entire region of the display to use a larger screen. For example, the electronic device may hide the system button from the screen to use the full screen, when displaying a screen related to a specific operation (for example, a video play screen, a game screen, or the like).

DETAILED DESCRIPTION OF THE INVENTION

Technical Objects

However, a user can use the full screen, but should perform an additional interaction with an electronic device to display the hidden system button to use a function corresponding to the system button. For example, the user may perform a set gesture-based input, or may use a set external button to display the hidden system button on the screen, and may execute a function by means of the system button after performing an additional input on the displayed system button.

Various embodiments disclose a method and an apparatus in an electronic device providing a system button in a display, which can distinguish a user input when displaying a screen related to a specific operation (for example, an executed application) on the entire region of the display (for example, displaying a full screen), without displaying the system button, and can more easily execute a function by means of the hidden system button according to a user input.

Various embodiments disclose a method and an apparatus which can distinguish a user input when displaying a screen related to a specific operation on a full screen (a state in which a system button is processed transparently and is not displayed, or the system button is displayed translucently), and can execute a function related to the hidden system button or a function related to the executed specific operation according to a user input.

Technical Solving Means

According to various embodiments of the present disclosure, an electronic device may include: a display; a memory; and a processor electrically connected with the display and the memory, and the processor may be configured to detect a user input through a touch region comprising a system button on the display, to identify the user input, and to execute a system function by means of the system button or an application function according to the user input on the touch region comprising the system button.

According to various embodiments of the present disclosure, an operating method of an electronic device may include: displaying an application on a full screen; detecting a user input through a touch region comprising a system button on the full screen; identifying the user input; and executing a system function by means of the system button or an application function according to the user input on the touch region comprising the system button.

To achieve the above-mentioned objects, various embodiments of the present disclosure may include a computer readable recording medium which records a program for executing the above-described method in a processor.

Advantageous Effect

According to an electronic device and an operating method thereof according to various embodiments, in an electronic device providing a system button in a display, a screen related to a specific operation may be displayed through the entire region of the display without displaying the system button (for example, displaying a full screen). According to various embodiments, even when the system button is not displayed, a function related to the system button or a function related to the executed specific operation can be more easily performed according to a user input. According to various embodiments, usability, convenience, and competitiveness of the electronic device can be enhanced.

BEST MODE FOR EMBODYING THE INVENTION

Figure 1:
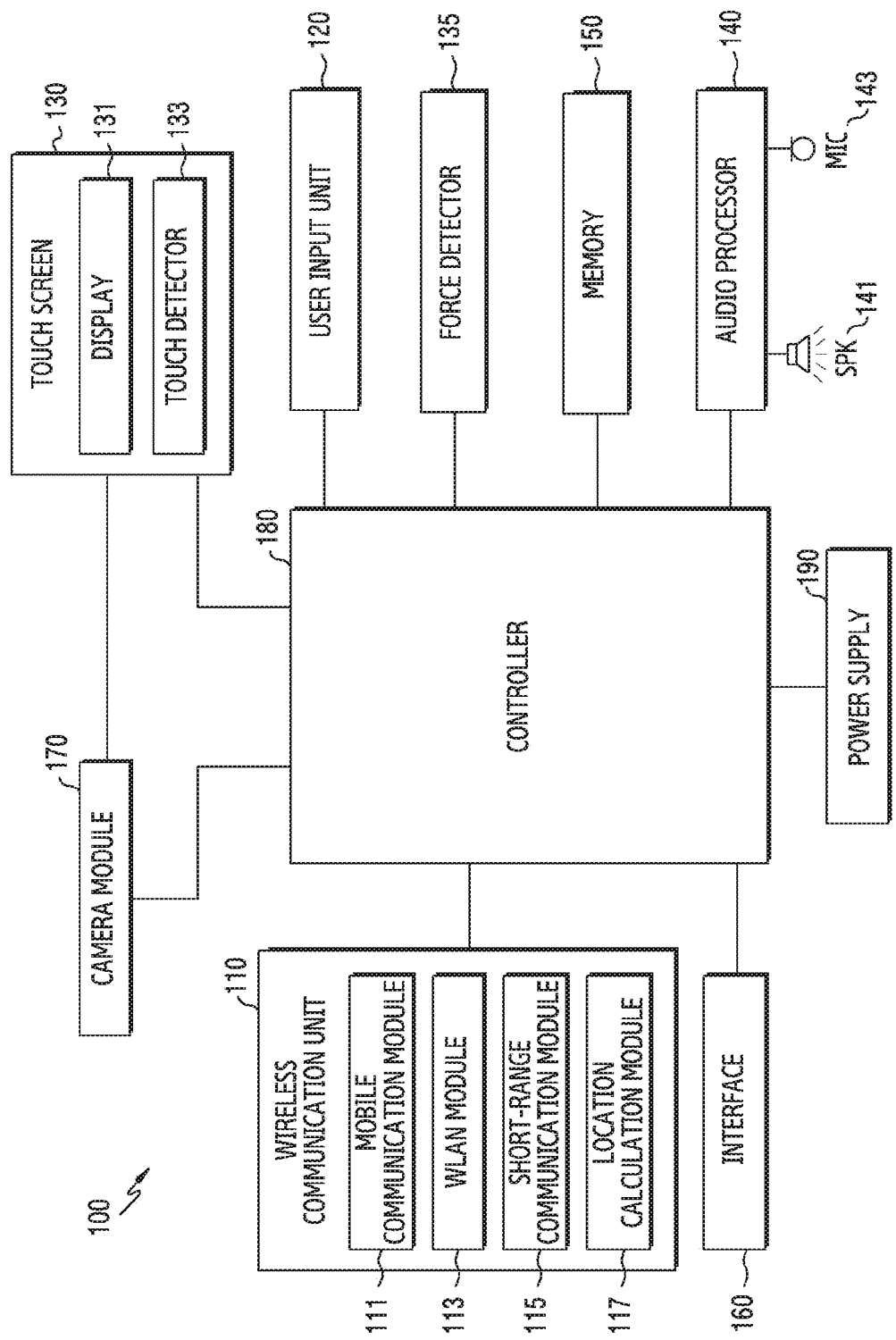
FIG. 1 is a view schematically illustrating a configuration of an electronic device according to various embodiments.

Hereinafter, various embodiments of the present disclosure will be described with reference to the accompanying drawings. It should be appreciated that various embodiments of the present disclosure and the terms used therein are not intended to limit the technological features set forth herein to particular embodiments, and include various modifications, equivalents, and/or alternatives for a corresponding embodiment. With regard to the description of the drawings, similar reference numerals may be used to refer to similar elements. In addition, embodiments disclosed in the present disclosure are proposed for description and understanding of the disclosed technical features, and do not limit the scope of the technology disclosed in the present disclosure. Accordingly, the scope of the present disclosure should be interpreted as including all changes based on the technical concept of the present disclosure or various other embodiments.

Various embodiments of the present disclosure disclose an electronic device which provides a system button (or key) through a display, and an operating method therefor. Various embodiments disclose a method and an apparatus in an electronic device providing a system button in a display, which enable a system function by means of the system button to be used according to a user input, even when displaying a screen related to a specific operation (for example, an executed application) through the entire region of the display (for example, displaying a full screen), without displaying the system button. According to various embodiments, an electronic device can distinguish a user input when displaying a screen related to a specific operation on a full screen, and can control a function related to a hidden system button or a function related to the executed specific operation more simply and more easily according to the user input.

In various embodiments, an electronic device may include all devices using one or more of various processors, such as an application processor (AP), a communication processor (CP), a graphic processing unit (GPU), and a central processing unit (CPU). For example, the electronic device may include all information and communication device, multimedia devices, wearable devices, and internet of things (IoT) devices, including a system button through a display and including an input device (for example, a force sensor or the like) capable of detecting an additional user input, and an application device therefor.

An electronic device according to various embodiments may include at least one of, for example, smartphones, tablet personal computers (PCs), mobile phones, video telephones, electronic book readers, laptop PCs, netbook computers, personal digital assistants (PDAs), portable multimedia players (PMPs), Motion Picture Experts Group (MPEG-1 or MPEG-2) Audio Layer 3 (MP3) players, mobile medical devices, or cameras. According to some embodiments, the electronic devices may include at least one of, for example, televisions (TVs), digital video disk (DVD) players, audios, refrigerators, air conditioners, cleaners, ovens, microwave ovens, washing machines, air cleaners, set-top boxes, home automation control panels, media boxes (for example, Samsung HomeSync™, Apple TV™, or Google TV™), game consoles (for example, Xbox™ and PlayStation™), electronic dictionaries, electronic keys, camcorders, or electronic picture frames.

According to another embodiment, the electronic devices may include at least one of medical devices (for example, various portable medical measurement devices (for example, a blood glucose monitoring device, a heartbeat measuring device, a blood pressure measuring device, a body temperature measuring device, and the like)), navigation devices, global navigation satellite systems (GNSS), vehicle infotainment devices, electronic equipment for vessels (for example, navigation systems and gyrocompasses), head units for vehicles, industrial or home robots, drones, or points of sales (POSs) of stores. According to some embodiments, the electronic devices may include at least one of furniture, a part of buildings/structures or cars, electronic boards, electronic signature receiving devices, or various measuring instruments (for example, water meters, electricity meters, gas meters, or wave meters, and the like). According to various embodiments, the electronic devices may be flexible or may be a combination of two or more devices of the above-mentioned devices. Also, electronic devices according to various embodiments are not limited to the above-mentioned devices.

In addition, according to various embodiments, the term "user" may refer to a person who uses the electronic device or a device that uses the electronic device (for example, an artificial intelligence electronic device).

At least part of a device (for example, modules or functions thereof) or a method (for example, operations) according to various embodiments, for example, may be implemented by instructions stored in a computer-readable recording medium (for example, a memory) in the form of a program module. When the instruction is executed by a processor, one or more processors may perform a function corresponding to the instruction.

The computer-readable recording media may include a hard disk, a floppy disk, magnetic media (for example, a magnetic tape), optical recording media (for example, compact disc read only memory (CD-ROM) and a digital versatile disc (DVD), magneto-optical media (for example, a floptical disk)), or an internal memory. The instruction may include a code generated by a compiler or a code executable using an interpreter. A module or a program module according to various embodiments may include at least one of the above elements, or a portion of the above elements may be omitted, or additional other elements may be further included. Operations performed by a module, a program module, or other elements according to various embodiments may be executed sequentially, in parallel, repeatedly, or in a heuristic method, or a portion of operations may be executed in different sequences, omitted, or other operations may be added.

Hereinafter, an operating method and an apparatus according to various embodiments of the present disclosure will be described with reference to the accompanying drawings. However, since various embodiments of the present disclosure are not restricted or limited by the descriptions presented below, it should be noted that the descriptions are applicable to various embodiments based on the embodiments presented below. In various embodiments of the present disclosure described hereinafter, a hardware-wise approach method will be described by way of an example.

However, since various embodiments of the present disclosure include technology using both hardware and software, various embodiments of the present disclosure do not exclude software-based approach methods.

FIG. 1 is a view schematically illustrating a configuration of an electronic device according to various embodiments.

Referring to FIG. 1, the electronic device 100 according to various embodiments may include, for example, a wireless communication unit 110, a user input unit 120, a touch screen 130, a force detector 135, an audio processor 140, a memory 150, an interface 160, a camera module 170, a controller 180 (for example, a processor including a processing circuitry), and a power supply 190. In various embodiments of the present disclosure, the electronic device 100 may include more elements or fewer elements than in FIG. 1 since the elements illustrated in FIG. 1 are not essential. For example, the electronic device 100 according to various embodiments may not include some elements such as the wireless communication unit 110 or the camera module 170 according to a type of the electronic device 100.

The wireless communication unit 110 may include one or more modules enabling wireless communication between the electronic device 100 and another electronic device. For example, the wireless communication unit 110 may include a mobile communication module 111, a wireless local area network (WLAN) module 113, a short-range communication module 115, and a location calculation module 117. In various embodiments, the wireless communication unit 110 may include a module (for example, a short-range communication module, a long-range communication module) to communicate with a surrounding external electronic device.

The mobile communication module 111 may include, for example, a cellular module. The mobile communication module 111 may exchange a wireless signal with at least one of a base station, an external electronic device, or various servers (for example, an application server, a management server, an integration server, a provider server, a content server, an Internet server, or a cloud server) on a mobile communication network. The wireless signal may include a voice signal, a data signal, or various types of control signals. The mobile communication module 111 may transmit various data necessary for operations of the electronic device 100 to an external electronic device in response to a user request.

The WLAN module 113 may indicate a module for accessing wireless Internet and forming a WLAN link with another electronic device. The WLAN module 113 may be embedded in the electronic device 100 or may be provided outside the electronic device 100. As wireless Internet technology, wireless fidelity (WiFi), wireless gigabit alliance (WiGig), wireless broadband (Wibro), world interoperability for microwave access (WiMax), high speed downlink packet access (HSPDA), or millimeter wave (mmWave) may be used. The WLAN module 113 may interwork with an external electronic device connected with the electronic device 100 through a network (for example, a wireless Internet network), and may transmit various data of the electronic device 100 to the external electronic device, or may receive data from the external electronic device. The WLAN module 113 may be always maintained in an on-state or may be turned on/off according to setting of the electronic device 100 or a user input.

The short-range communication module 115 may indicate a module for performing short range communication. As short-range communication technology, Bluetooth, Bluetooth low energy (BLE), radio frequency identification (RFID), infrared data association (IrDA), ultra wideband (UWB), zigBee, near field communication (NFC), or the like may be used. The short-range communication module 115 may interwork with an external electronic device connected with the electronic device 100 through a network (for example, a short-range communication network), and may transmit various data of the electronic device 100 to the external electronic device, or may receive data from the external electronic device. The short-range communication module 115 may be always maintained in an on-state, or may be turned on/off according to setting of the electronic device 100 or a user input.

The location calculation module 117 is a module for obtaining a location of the electronic device 100, and may include a GPS module as a representative example. The location calculation module 117 may measure the location of the electronic device 100 based on the principle of triangulation. Location information of the electronic device 100 may be obtained by various methods.

The user input unit 120 may generate input data for controlling an operation of the electronic device 100 in response to a user input. The user input unit 120 may include at least one input device for detecting user's various inputs. For example, the user input unit 120 may include a key pad, a dome switch, a physical button, a touch pad (resistive/capacitive), a jog & shuttle, a sensor, and the like. According to an embodiment, the user input unit 120 may include an electronic pen. According to an embodiment, the user input unit 120 may be implemented to receive an input of a force touch. According to an embodiment, the user input unit 120 may include a software button (for example, a system button).

According to various embodiments, the sensor may measure a physical quantity or detect an operation state of the electronic device 100, and may convert measured or detected information into an electric signal. The sensor may include, for example, a force sensor, an iris scan sensor, a fingerprint scan sensor, an image sensor, an illuminance sensor, or the like. In addition, the sensor may include at least one of a gesture sensor, a gyro sensor, a pressure sensor, a magnetic sensor, an acceleration sensor, a terrestrial sensor, a motion recognition sensor, a grip sensor, a proximity sensor, a color sensor (for example, red, green, blue (RGB) sensor), a medical sensor (for example, a heart rate sensor), a temperature-humidity sensor, a ultra violet (UV) sensor, or a heart rate monitor (HRM) sensor. In addition, the sensor may include, for example, an E-nose sensor, an electromyography (EMG) sensor, an electroencephalogram (EEG) sensor, an electrocardiogram (ECG) sensor, an infrared (IR) sensor, a barometer sensor, or the like.

A part of the user input unit 120 may be implemented in the form of an external button of the electronic device 100, and a part or entirety of the user input unit 120 may be implemented as a touch panel. The user input unit 120 may receive a user input to initiate an operation of the electronic device 10 (for example, a power on/off function, an audio play function, a system button displaying/hiding function, or a full screen display function), and may generate an input signal according to the user input.

The touch screen 130 indicates an input/output device which performs an input function and a display (output) function, simultaneously, and may include a display 131 and a touch detector 133. The touch screen 130 may provide an input/output interface for an interaction between the electronic device 100 and the user. The touch screen 130 may include a mediator role for transmitting a user's touch input to the electronic device 100, and for showing an output from the electronic device 100 to the user. The touch screen 130 may show a visual output to the user. The visual output may be displayed in the form of a text, a graphic, or a video, or a combination thereof.

The display 131 may display (output) a variety of information processed in the electronic device 100. The display 131 may display various user interfaces (UIs) or graphic UIs (GUIs) related to the use of the electronic device 100. According to various embodiments, the display 131 may display a partial screen including and displaying a system button, and may display an application screen on a full screen by processing the system button transparently (or translucently) (for example, by hiding the system button). For example, the display 131 may process the system button transparently or translucently, and may provide an effect of hiding the system button from the display 131 or displaying the system button to look translucent. According to various embodiments, when the system button is processed transparently (or hidden), the display 131 may not display the system button.

Various displays may be used for the display 131. For example, the display 131 may include a liquid crystal display (LCD), a light emitting diode (LED) display, an organic LED (OLED) display, a microelectromechanical system (MEMS) display, an electronic paper display, or the like. Some displays may be implemented by a transparent display including a transparent type of display or a photo-transparent type of display. In various embodiments, a bended display or a flexible display may be used for the display 131.

The touch detector 133 may be mounted in the display 131, and may detect a user input contacting or approaching a surface of the touch screen 130. The user input may include a touch input or a proximity input inputted based on at least one of a single touch, a multi-touch, hovering, or an air gesture. The touch detector 133 may receive a user input for initiating an operation related to use of the electronic device 100 according to various embodiments, and may generate an input signal according to the user input. The touch detector 133 may be configured to convert a change in pressure applied to a specific portion of the display 131, or in capacitance generated at a specific portion of the display 131 into an electric input signal. The touch detector 133 may detect a location and an area of a portion on the surface of the display 131 that an input tool (for example, a user finger, an electronic pen) touches or approaches. In addition, the touch detector 133 may be implemented to detect a pressure (for example, a force touch) when the user touches according to an applied touch method.

The force detector 135 may be disposed on a lower end of the display 131. According to various embodiments, the force detector 135 may be attached to the display 131 or may be directly formed on one surface of the display 131. The force detector 135 may be implemented to include, for example, a force sensor (not shown) and/or a force sensor integrated circuit (IC) (not shown). The force detector 135 may detect a pressure by a self-capacitance method or a mutual capacitance method. In various embodiments, the force detector 135 may detect a force touch out of user inputs (for example, a touch, a force touch), and may transmit a corresponding force signal to the controller 180. According to various embodiments, the force detector 135 may detect a force signal (for example, pressure coordinates, an intensity of pressure) caused by an external electronic pen.

According to various embodiments, the touch detector 133 and the force detector 135 are detectors for detecting various user inputs such as a first input (for example, a force touch) and a second input (for example, a normal touch), and may be included in the touch screen 130.

The audio processor 140 may transmit an audio signal received from the controller 180 to a speaker (SPK) 141, and may transmit an audio signal received from a microphone (MIC) 143, such as a voice, to the controller 180. The audio processor 140 may convert voice/sound data into an audible sound under control the controller 180, and output the sound through the speaker 141, and may convert an audio signal received from the microphone 143, such as a voice, into a digital signal, and may transmit the digital signal to the controller 180.

The speaker 141 may output audio data which is received from the wireless communication unit 110, or is stored in the memory 150. The speaker 141 may output sound signals related to various operations (functions) performed in the electronic device 100.

The microphone 143 may receive an external sound signal and may process the sound signal into electric voice data. The microphone 143 may have various noise reduction algorithms implemented to remove a noise generated in the process of receiving the external sound signal. The microphone 143 may serve to input audio streaming such as a voice command.

The memory 150 may store one or more programs executable by the controller 180, and may temporarily store inputted/outputted data. The inputted/outputted data may include, for example, a file such as a video, an image, a photo, or an audio. The memory 150 may serve to store obtained data. The memory 150 may store data obtained in real time in a temporary storage device, and may store data confirmed to be stored in a storage device which stores data for long time.

The memory 150 may store one or more programs, data, or instructions related to the controller 180 (for example, a processor) displaying a screen related to an application through the entire region of the display 131 (for example, displaying a full screen), without displaying a system button, and enabling a system function of the system button to be used according to a user input even when the system button is not displayed. According to various embodiments, the memory 150 may store one or more programs, data, or instructions related to operations of displaying an execution screen of an application without displaying a system button, detecting a user input on a region overlapping the undisplayed system button, identifying the user input, and processing a system function or an application function in the region overlapping the system button according to the user input.

The memory 150 may include one or more application modules (or software modules). The memory 150 may store one or more pieces of reference information for distinguishing a user input according to various embodiments. For example, the reference information may include input levels for distinguishing various inputs, such as a first input (for example, a force touch), a second input (for example, a touch), a third input (for example, a force long press), a fourth input (for example, a long press), a fifth input (for example, a drag) from user inputs. In various embodiments, the user input may be divided into a touch-based input which is detected through the touch detector 133 of the touch screen 130, and a force touch-based input which is detected through the force detector 135. For example, in various embodiments, the user input may be broadly divided into the force-touch based first input and the touch-based second input, and the third input may be detected from the distinguished first input, and the fourth input or the fifth input may be detected from the distinguished second input.

The interface 160 may receive data from another electronic device, or receive power, and may transmit data or power to the respective elements of the electronic device 100. The interface 160 may allow data inside the electronic device 100 to be transmitted to another electronic device. For example, the interface 160 may include a wired/wireless headphone port, an external charger port, a wired/wireless data port, a memory card port, an audio input/output port, a video input/output port, or an earphone port.

The camera module 170 indicates an element supporting a photographing function of the electronic device 100. The camera module 170 may photograph a certain subject under control of the controller 180, and may transmit photographed data (for example, an image) to the display 131 and the controller 180.

The controller 180 (for example, a processor) may control an overall operation of the electronic device 100. In various embodiments, the controller 180 may include one or more processors, or the controller 180 may be called a processor. For example, the controller 180 may include a CP, an AP, an interface (for example, a general purpose input/output (GPIO)), or an internal memory as a separate element, or may be integrated into one or more integrated circuits. According to an embodiment, the AP may execute various software programs and perform various functions for the electronic device 100, and the CP may perform processing and controlling for voice communication and data communication. In addition, the controller 180 may execute a specific software module (for example, an instruction set) stored in the memory 150, and may perform specific various functions corresponding to the module.

In various embodiments, the controller 180 may control an operation of a hardware module such as the audio processor 140, the interface 150, the display 131, or the camera module 170. According to various embodiments, the controller 180 may be electrically connected with the display 131 and the memory 150 of the electronic device 100.

According to various embodiments, the controller 180 may receive a touch signal (for example, a location signal (for example, coordinates (x,y)) from the touch detector 133, and may receive a force signal (for example, a pressure coordinate (z) or an intensity of pressure (z)) from the force detector 135 (for example, a force sensor). According to an embodiment, the controller 180 may synchronize the touch signal of the touch detector 133 and the force signal of the force detector 135 with each other. For example, the touch signal may be detected when the display 131 is touched by a user, and may be generated without a force signal. On the other hand, the force signal may be detected when the display 131 is touched by a user and is pressed down (for example, when pressure is applied in the direction of gravity), and the force signal is not generated without a touch signal. Accordingly, when the force signal is generated, the controller 180 may synchronize the touch signal and the force signal with each other, and may process them as one input.

According to various embodiments, the controller 180 may receive a touch signal (for example, a location signal, coordinates) of an external electronic pen detected at the touch detector 133, and may receive a force signal (for example, a pressure coordinate, an intensity of pressure) by the external electronic pen detected at the force detector 135. The controller 180 may synchronize the touch signal of the electronic pen and the force signal of the electronic pen, and may process them as one input.

According to various embodiments, the controller 180 may control operations of displaying a screen related to an application through the entire region of the display 131 without displaying a system button (for example, displaying a full screen), and of enabling a system function of the system button to be used according to a user input even when the system button is not displayed. According to various embodiments, the controller 180 may control an operation of detecting a user input on a region of the display 131 overlapping with the undisplayed system button, an operation of identifying the user input, and an operation of processing a system function or an application function in the region overlapping the system button according to the user input.

According to various embodiments, the controller 180 may detect a user input by means of a system button region (for example, a touch region including a system button) of the display 131, and may determine whether the user input is a first input for a system function or a second input for an application function, in response to the user input being detected on the system button region. According to an embodiment, in response to the first input, the controller 180 may control to execute a system function based on a system button of a location where the user input is detected, and to display a relevant screen through the display 131. According to an embodiment, in response to the second input, the controller 180 may control to execute an application function based on an object of the location where the user input is detected, and to display a relevant screen through the display 131.

The control operation of the controller 180 according to various embodiments will be described in detail with reference to the drawings.

The power supply 190 may receive external power or internal power under control of the controller 180, and may supply power necessary for operations of the respective elements. In various embodiments, the power supply 190 may supply or shut off (on/off) power to the wireless communication unit 110, the display 131, and the camera module 170, or the like under control of the controller 180. According to an embodiment, the power supply 190 may include, for example, a battery control circuit. For example, the power supply 190 may include a battery (for example, a rechargeable battery and/or a solar battery), a battery remaining capacity measurement circuit (for example, a fuel gauge), a power management integrated circuit (PMIC), a charging circuit, a booster circuit, or the like.

As described above, the electronic device according to various embodiments may include: the display 131, the memory 150, and a processor (for example, the controller 180) electrically connected with the display 131 and the memory 150, and the processor 180 may be configured to detect a user input through a touch region (for example, the system button region 200) including a system button 210, 220, 230 on the display 131, to identify the user input, and to execute a system function by means of the system button 210, 220, 230 or an application function according to the user input on the touch region (for example, the system button region 200) including the system button 210, 220, 230.

According to various embodiments, the processor may be configured to detect a user input on the touch region of the display, to determine whether the user input is a first input for the system function or a second input for the application function, in response to the user input being detected on the touch region, and, when the user input is the first input, to execute the system function corresponding to a system button of a location where the user input is detected, and to display a relevant screen, and, when the user input is the second input, to execute the application function based on an object of the location where the user input is detected, and to display a relevant screen.

According to various embodiments, the system button may be provided transparently or translucently on the touch region.

According to various embodiments, when a first sensing value by a touch detector is detected and a second sensing value by a force detector is detected, the processor may be configured to identify the user input as the first input based on the second sensing value.

According to various embodiments, when a first sensing value by a touch detector is detected, the processor may be configured to identify the user input as the second input based on the first sensing value.

According to various embodiments, the system button may include one or more software buttons to view a recent list, to return to a home screen, or to return to a previous screen.

According to various embodiments, in response to execution of an application being detected, the processor may be configured to determine whether the application is in a mode in which the application operates on a full screen of the display, or in a mode in which the application operates on a partial screen of the display.

According to various embodiments, the processor may be configured to control to show or hide the system button based on various inputs.

According to various embodiments, when the user input on the touch region comprising the system button is a force touch, the processor may be configured to determine to process an operation by means of the system button in response to the user input, and to execute another system function by means of one system button in response to an input method of the user input on the system button.

According to various embodiments, the processor may be configured to determine whether the force touch is changed, and, when the force touch is not changed, the processor is configured to execute a first function by means of the system button, and, when the force touch is changed, to execute a second function by means of the system button.

Figure 2A:
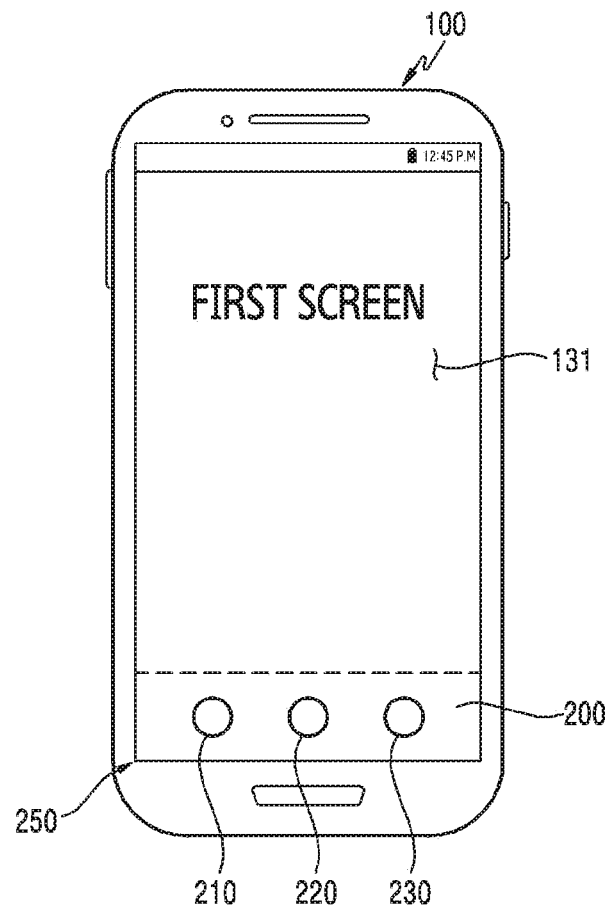
FIGS. 2A and 2B are views illustrating a system button in an electronic device according to various embodiments of the present disclosure.
Figure 2B:
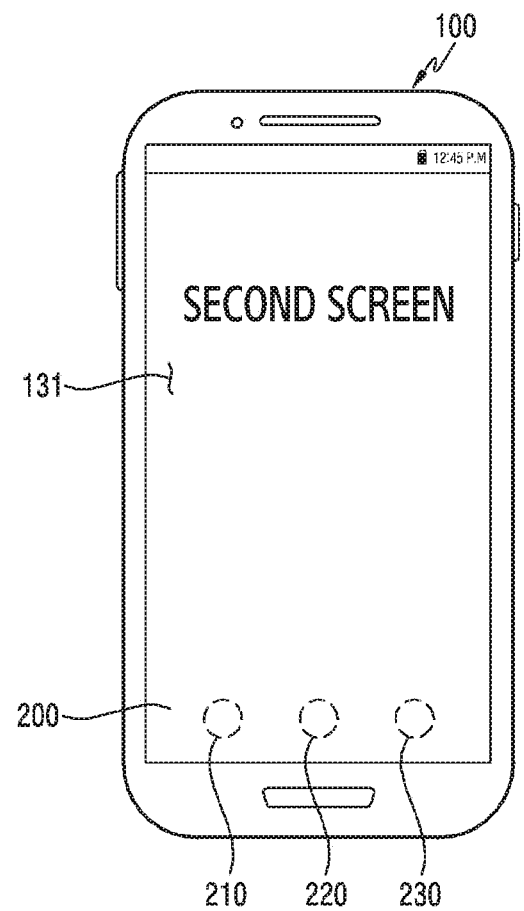

FIGS. 2A and 2B are views illustrating a system button in an electronic device according to various embodiments of the present disclosure.

Referring to FIGS. 2A and 2B, FIG. 2A illustrates an example in which a systems button (or system key) 210, 220, 230 of a system button region 200 is displayed along with a first screen (for example, an application execution screen) through the display 131 of the electronic device 100, and FIG. 2B illustrates an example in which the system button 210, 220, 230 of the system button region 200 is transparent and thus is not displayed, or is displayed translucently through the display 131 of the electronic device 100, and a second screen (for example, an application execution screen) is displayed as a full screen through the entire region of the display 131.

In various embodiments, the system button region 200 is a touch region which is allocated the system button 210, 220, 230, and may be implemented independently from an application execution screen (for example, as a separate layer), and may provide the system button 210, 220, 230.

In various embodiments, the system button 210, 220, 230 may indicate one or more buttons (or keys) for executing a system function which is set to be operated by a user operation at any time even while various operations of the electronic device 100 are being executed, for example, set to be globally operated. In various embodiments, the system button 210, 220, 230 may be a software button and may be displayed through the display 131 of the electronic device 100.

According to various embodiments, the system button 210, 220, 230 may include, for example, a first button 210 for a system function of viewing a recent list, a second button 220 for a system function of returning to the home screen, or a third button 230 for a system function of returning to a previous screen. However, the present disclosure is not limited thereto, and the system button or the system function thereof may be implemented variously and complexly.

According to various embodiments, the first screen or the second screen may include a screen (for example, a UI, a GUI) executed by various applications installed in the electronic device 100 and executable and displayable. In various embodiments, the application may include an application for the home screen, an application for a menu screen, respective applications for various contents (for example, a game, a video, a digital broadcast, etc.), a gallery application, an application for photographing, a message application, or the like, and the first screen or the second screen may indicate a screen corresponding to an executed application.

According to various embodiments, the execution screen of the application may be displayed by separating (or dividing) the system button region 200 and the first screen (for example, an application execution screen) as shown in FIG. 2A, or by superimposing the system button region 200 on the application execution screen in an overlay method (for example, displaying a partial screen). For example, the first screen of the application and the system button 210, 220, 230 of the system button region 200 are displayed altogether as shown in FIG. 2A. In this case, a system function (for example, viewing a recent list, returning to the home screen, or returning to a previous screen) may be immediately executed according to a user input by means of the system button region 200 where the system button 210, 220, 230 is located.

According to various embodiments, to prevent the execution screen of the application from being covered, the system button 210, 220, 230 of the system button region 200 may be displayed on the display 131 transparently or translucently, and the second screen (for example, an application execution screen) may be displayed as a full screen by using the entire region as shown in FIG. 2B. According to various embodiments, when the system button 210, 220, 230 of the system button region 200 is provided transparently or translucently, the system button may not operate by a normal input (for example, a touch), and may operate by an input which is set to operate the system button (for example, a force touch).

According to an embodiment, an execution screen of an application (for example, a video play application, a game application, or the like) operating based on the full screen may be displayed through the entire region of the display 131, and the system button 210, 220, 230 of the system button region 200 may be processed transparently and may not be displayed on the display 131. According to another embodiment, when the execution screen of the application operating based on the full screen is displayed, the system button 210, 220, 230 of the system button region 220 may be provided translucently.

According to various embodiments, the system button 210, 220, 230 may be hidden from the display 131 by a user operation or automatically (for example, with reference to time). According to an embodiment, in a state as shown in FIG. 2A, the system button 210, 220, 230 may be activated (shown)/inactivated (hidden) according to an input for hiding the system button 210, 220, 230. For example, the user may select (touch) a specific location (for example, a hiding button) of the system button region 200, or may perform a user input operation (for example, dragging, flicking, or the like) of moving to a bezel portion 250 of a lower end of the display 131 while holding selection (touch) on a specific location (for example, an empty region) of the system button region 200. In response to the user input, the electronic device 100 may process hiding not to display the system button 210, 220, 230 on the display 131. To the contrary, the system button 210, 220, 230 that is not displayed on the screen may be processed to be displayed on the display 131 by the inverse operation of the above-described user input operation (for example, a user input operation of entering the screen from the bezel portion 250 of the lower end of the display 131).

In various embodiments, as shown in FIG. 2B, an execution screen related to a specific operation (for example, executing an application, entering a specific screen, etc.) may be displayed through the entire region of the display 131 (for example, displaying a full screen), without displaying the system button 210, 220, 230.

According to various embodiments, a system function related to the system button 210, 220, 230 may be enabled to be used according to a user input even when the system button 210, 220, 230 is not displayed. For example, according to various embodiments, the electronic device 100 may distinguish a user input (for example, a force touch, a touch) while displaying an execution screen related to a specific operation on a full screen, and may enable a function related to the hidden system button 210, 220, 230, or a function related to the executed specific operation to be controlled more simply and more easily according to a user input. That is, in various embodiments, the system button 210, 220, 230 may be enabled to be always manipulated (for example, to execute a system function) even when the system button 210, 220, 230 disappears.

According to an embodiment, even when the system button 210, 220, 230 is not displayed as shown in FIG. 2B, if a user presses a location where the system button 210, 220, 230 has been located using a force (for example, a force input), a force signal related to the system button 210, 220, 230 may be transmitted and the system button 210, 220, 230 may operate, and a system function related to the corresponding system button may be executed. In addition, in various embodiments, by touching a location where the system button 210, 220, 230 has been located, a touch signal associated with the execution screen of the application may be transmitted, and a function related to the application may be executed. According to various embodiments, since the force signal and the touch signal are distinguished, the system function and the application-associated function may be independently processed, without colliding with each other, according to a user input on an overlapping region (for example, a location of the system button region 200) between the system button 210, 220, 230 and the execution screen of the application, while the system button 210, 220, 230 is hidden.

Hereinafter, a specific operation of distinguishing a user input on the hidden system button region 200, and processing a system function or an application-associated function based on the distinguished user input according to various embodiments will be described.

Figure 3:
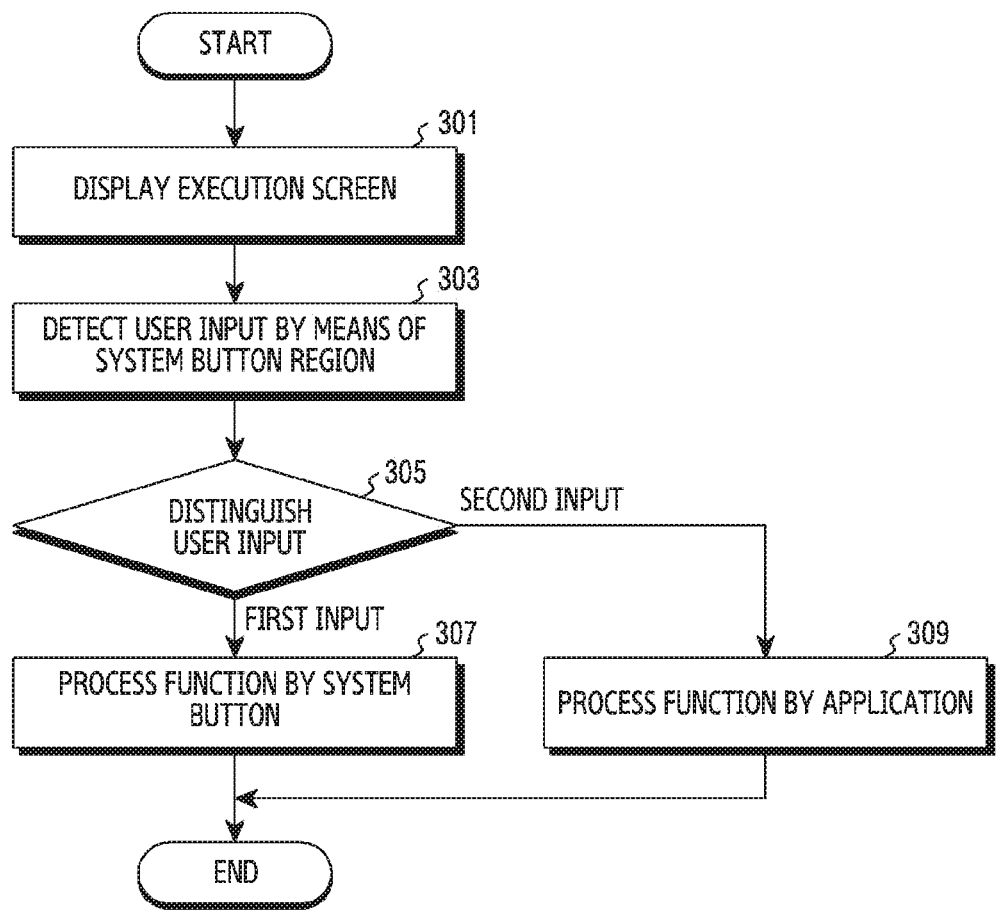
FIG. 3 is a flowchart illustrating an operating method of an electronic device according to various embodiments of the present disclosure.

FIG. 3 is a flowchart illustrating an operating method of an electronic device according to various embodiments of the present disclosure.

Referring to FIG. 3, in operation 301, the controller 180 (for example, a processor) of the electronic device 100 may display an execution screen. When a user input (operation) for executing a specific application is detected, the controller 180 may execute the corresponding application. According to various embodiments, the application may include various applications which are installed in the electronic device and are executable and displayable, such as an application for the home screen, an application for a menu screen, respective applications for various contents (for example, a game, a video, digital broadcasting, or the like), a gallery application, an application for photographing, a message application, or the like. In response to the application being executed, the controller 180 may control to display the execution screen (for example, a UI, a GUI) related to the executed application through the display 131. According to various embodiments, the controller 180 may provide the system button 210, 220, 230 transparently or translucently when displaying the execution screen of the application. According to an embodiment, the controller 180 may hide the system button to prevent the execution screen from being covered, and may not display the system button on the display 131.

In operation 303, the controller 180 may detect a user input by means of the system button region 200. For example, the controller 180 may distinguish between an input by means of the system button region 200 and an input by means of another region, based on a location on the touch screen 130 that is touched by a user's finger. According to an embodiment, a user may touch the system button region 200 to perform an operation associated with the application (for example, selecting an icon, selecting a link, etc.) or to perform an operation (for example, a system function) associated with the system button 210, 220, 230 on the execution screen of the application.

In operation 305, the controller 180 may distinguish the user input. For example, when the user input on the system button region 200 is detected, the controller 180 may determine whether the use input corresponds to a first input (for example, a force touch) or a second input (for example, a touch). According to an embodiment, the controller 180 may detect a first sensing value by the touch detector 133, and then may detect a second sensing value by the force detector 135 according to one user input (for example, a change in the type of input, touch input→force input). The controller 180 may identify the user input as the first input (for example, the force touch) based on the second sensing value. According to an embodiment, the controller 180 may detect only the first sensing value by the touch detector 133 according to a user input (for example, a touch input, not a force input). When the second sensing value is not detected after the first sensing value is detected, the controller 180 may identify the user input as the second input (for example, the touch) based on the first sensing value.

When it is determined that the user input is the first input (for example, the force touch) in operation 305, the controller 180 may process a system function by means of the system button 210, 220, or 230 in operation 307. For example, the controller 180 may control to execute a system function (for example, viewing a recent list, returning to the home screen, or returning to a previous screen) set for the system button 210, 220, or 230 of a location where the user input is detected by the touch detector 133, and to display a corresponding screen through the display 131.

When it is determined that the user input is the second input in operation 305, the controller 180 may process an application function by means of the application in operation 309. For example, the controller 180 may control to recognize an object (for example, a link, an icon, a menu, a function button, or the like) of the location where the user input is detected by the touch detector 133, to execute an application-related function associated with the object in response to the user input, and to display a corresponding screen through the display 131.

Figure 4:
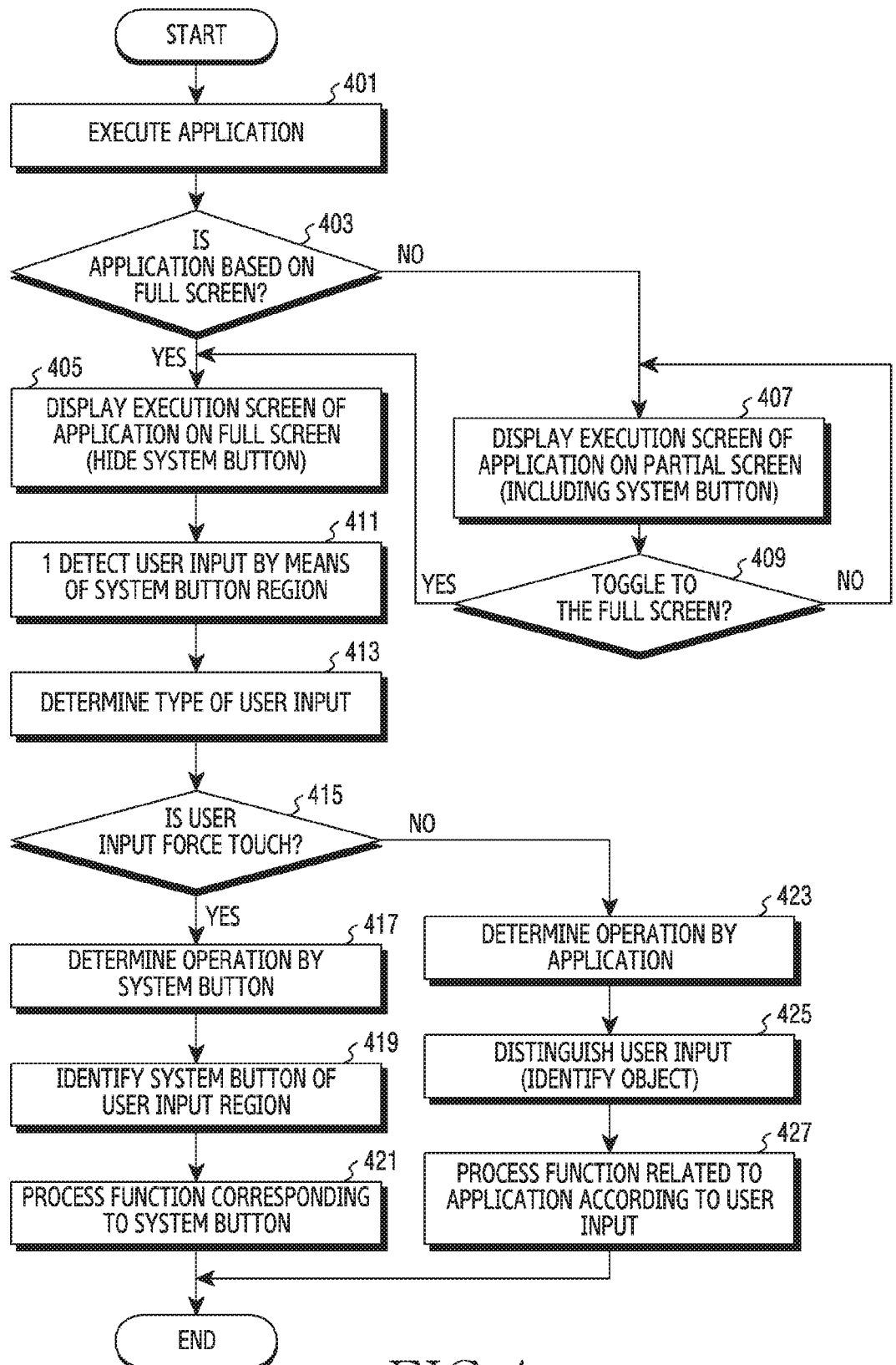
FIG. 4 is a flowchart illustrating an operating method of a system button in an electronic device according to various embodiments of the present disclosure.

FIG. 4 is a flowchart illustrating an operating method of a system button in an electronic device according to various embodiments of the present disclosure.

Referring to FIG. 4, in operation 401, the controller 180 (for example, a processor) of the electronic device 100 may execute an application. According to various embodiments, the application may include various applications which are installed in the electronic device 100 and are executable and displayable. The controller 180 may determine (detect) an execution mode (for example, a full screen mode) of the application corresponding to a user's operation.

In operation 403, the controller 180 may determine whether the executed application is using a full screen mode or not. For example, when the execution of the application is detected, the controller 180 may determine an execution mode (or state) of the application, based on whether the corresponding application is executing a mode for operating on a full screen of the display 131 (for example, a mode in which the system button is processed transparently and is not displayed on the screen, or is processed translucently and is displayed, and the screen of the application is displayed on the full screen), or whether the corresponding application displays a certain region (for example, the system button region 200) set to include the system button, and operates on a partial screen of the display 131. In various embodiments, the partial screen may be an execution screen of the application that is distinguished (divided) from the system button region 200, or may include a screen that is displayed by superimposing the system button region 200 on the execution screen of the application in an overlay method.

When the execution mode of the executed application is not based on the full screen, that is, based on the partial screen, in operation 403 (No in operation 403), the controller 180 may display the execution screen of the application on the partial screen in operation 407. For example, the controller 180 may control to display the execution screen of the application and the system button 210, 220, 230 by means of the system button region 200 on the display 131 altogether.

In operation 409, the controller 180 may determine whether to toggle to the full screen. For example, the controller 180 may determine whether there is a request for hiding the system button 210, 220, 230 displayed on the system button region. According to various embodiments, the system button 210, 220, 230 may be activated (shown)/inactivated (hidden) based on various inputs. For example, as described above, the user may perform a user input operation of selecting (touching) the system button region 200 and moving to a bezel portion of a lower end of the display 131 (for example, dragging, flicking, or the like). In response to the user input, the controller 180 may hide the system button 210, 220, 230 not to be displayed on the display 131. To the contrary, the system button 210, 220, 230 may be processed to be displayed on the screen by the inverse operation (for example, a user input operation of entering the screen from the bezel portion of the lower end of the display 131) of the user input operation on the undisplayed system button 210, 220, 230 described above.

When toggling to the full screen is not detected in operation 409 (No in operation 409), the controller 180 proceeds to operation 407 to perform operations after operation 407.

When toggling to the full screen is detected in operation 409 (Yes in operation 409), the controller 180 proceeds to operation 405 to perform operations after operation 405.

When the execution mode of the executed application is based on the full screen in operation 403 (Yes in operation 403), the controller 180 may display the execution screen of the application on the full screen in operation 405. For example, the controller 180 may process to display the execution screen of the application through the entire region of the display 131, without displaying the system button 210, 220, 230 through the system button region 200 (for example, by hiding the system button).

In operation 411, the controller 180 may detect a user input by means of the system button region 200. The controller 180 may distinguish between an input by means of the system button region 200 and an input by means of another region, based on a location on the touch screen 130 that is touched by a user's finger. According to an embodiment, a user may touch the system button region 200 to perform an operation associated with the application (for example, selecting an icon, selecting a link, etc.) or to perform an operation (for example, a system function) associated with the system button 210, 220, 230 on the execution screen of the application.

In operation 413, the controller 160 determine a type of the user input, and in operation 415, may determine whether the user input corresponds to a force touch or a touch. For example, when the system button 210, 220, 230 is not displayed, and a user input is detected through a certain region (or coordinates) of the system button region 200 where the system button 210, 220, 230 is located, the controller 180 may determine whether the corresponding user input is inputted as a force touch or a normal touch. According to an embodiment, the controller 180 may detect a first sensing value by the touch detector 133, and then may detect a second sensing value by the force detector 135 according to one user input (for example, touch input→force input). The controller 180 may determine the user input as a force touch based on the second sensing value. According to an embodiment, the controller 180 may detect only the first sensing value by the touch detector 133 according to a user input (for example, a touch input, not a force input). When the second sensing value is not detected after the first sensing value is detected, the controller 180 may determine the user input as a normal touch based on the first sensing value.

When it is determined that the user input is a force touch in operation 415 (Yes in operation 415), the controller 180 may determine to process an operation by means of a system button in response to the user input in operation 417. For example, the controller 180 may determine to execute a system function corresponding to the system button according to the user input.

In operation 419, the controller 180 may identify the system button of the region (location, coordinates) corresponding to the user input. For example, the controller 180 may determine the system button 210, 220, or 230 of the location where the user input is detected by the touch detector 133, or a system function corresponding to the system button.

In operation 421, the controller 180 may process the system function corresponding to the system button. For example, the controller 180 may control to execute the system function (for example, viewing a recent list, returning to the home screen, or returning a previous screen) set according to the system button, and to display a corresponding screen through the display 131. According to various embodiments, when processing the function by the system button, the controller 180 may distinguish an input method of the user input (for example, a force touch, a force long press (or a long press after a force touch) on the system button, and may differently execute the distinguished system function by one system button according to the corresponding input method.

When it is determined that the user input is a touch in operation 415 (No in operation 415), the controller 180 may determine to process an operation by the application in response to the user input in operation 423. For example, the controller 180 may determine to execute an application function associated with the application which is being executed according to the user input.

In operation 425, the controller 180 may distinguish the user input. For example, the controller 180 may identify an object (for example, a link, an icon, a menu, a function button, etc.) of the location where the user input is detected by the touch detector 133, and also, may distinguish an input method of the user input (for example, a touch, a drag, a long press, etc.).

In operation 427, the controller 180 may process an application function related to the application according to the user input. For example, the controller 180 may control to recognize the object (for example, a link, an icon, a menu, a function button, etc.) of the location where the user input is detected by the touch detector 133, to execute an application-related function associated with the object in response to the user, and to display a corresponding screen through the display 131.

Figure 5A:
FIG. 5 is a view illustrating an example of an operation of distinguishing a user input based on a hidden system button in an electronic device according to various embodiments of the present disclosure.
Figure 5B:
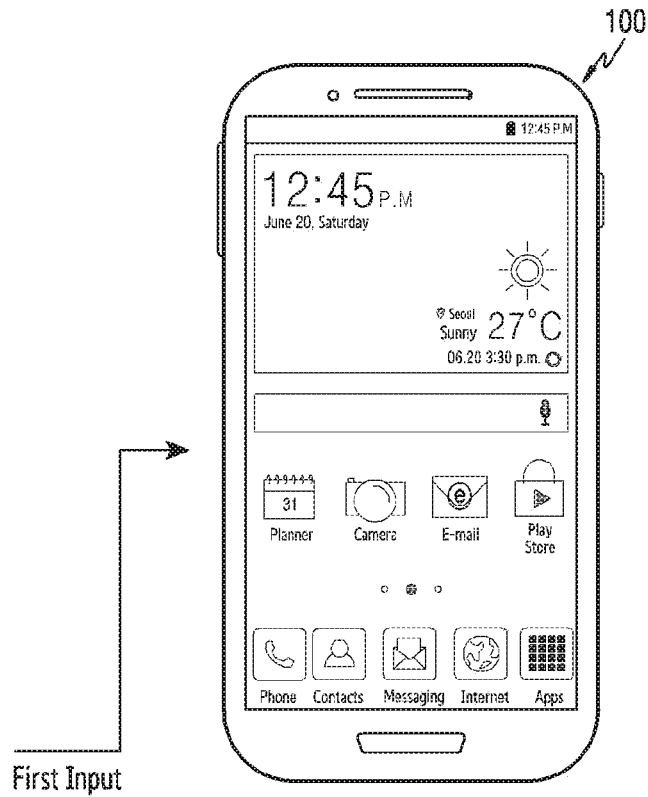
Figure 5C:
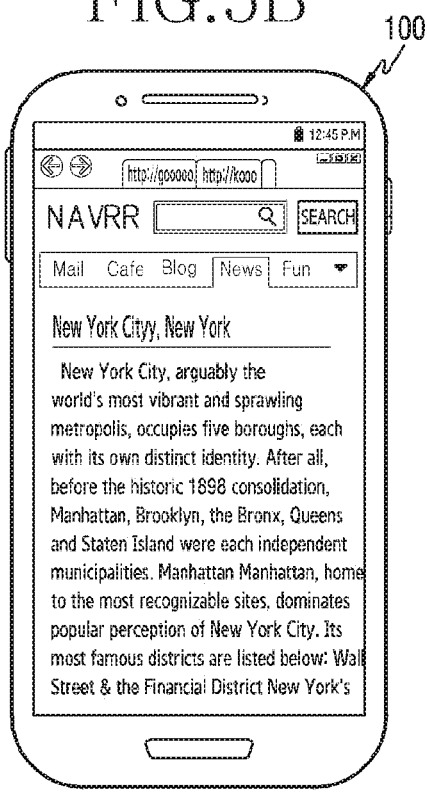

FIG. 5 is a view illustrating an example of an operation performed by distinguishing a user input based on a hidden system button in an electronic device according to various embodiments of the present disclosure.

Referring to FIG. 5, FIG. 5 illustrates an example of operations of distinguishing a user input on the hidden system button region 200, and of executing a system function or an application-associated function based on the distinguished user input.

As shown in example (A) of FIG. 5, example (A) of FIG. 5 illustrates a screen of the electronic device 100 on which an application is executed and an execution screen of the executed application is displayed on a full screen of the display 131. In this case, the system button 210, 220, 230 may be displayed transparently or translucently. According to an embodiment, as shown in example (A) of FIG. 5, a web page may be displayed on the full screen of the display 131. For example, the electronic device 100 may not display the system button 210, 220, 230 through the system button region 200 (for example, hide the system button), and may display the execution screen of the web page through the entire region of the display 131.

In the state as shown in example (A) of FIG. 5, the electronic device 100 may detect a user input by means of the system button region 200. For example, the electronic device 100 may distinguish an input by means of the system button region 200 and an input by means of another region, based on a location of the touch screen 130 that is touched by a user's finger. According to an embodiment, the user may touch the system button region 200 (500) to perform an operation associated with the application (for example, selecting an icon or a link), or to perform an operation (for example, a system function) associated with the system button 210, 220, 230 on the execution screen of the web page.

The electronic device 100 may determine a type of the user input, and may determine whether the user input corresponds to a first input (for example, a force touch), or a second input (for example, a touch). For example, when the system button 210, 220, 230 is not displayed, and the user input 500 is detected through a certain region (or coordinates) of the system button region 200 where the system button 210, 220, 230 has been located, the electronic device 100 may determine whether the corresponding user input is inputted as a force touch or a normal touch.

According to an embodiment, when the electronic device 100 detects a first sensing value by the touch detector 133, and then detects a second sensing value by the force detector 135 according to the user input (for example, a touch input→force input), the electronic device 100 may determine that the touch 500 of the system button region 200 is the first input based on the second sensing value. According to an embodiment, when the electronic device 100 detects only the first sensing value by the touch detector 133 and then does not detect the second sensing value after detecting the first sensing value according to a user input (for example, a touch input, not a force input), the electronic device 100 may determine that the touch 500 of the system button region 200 is the second input based on the first sensing value.

When it is determined that the user input 500 is the first input, the electronic device 100 may identify a system button (for example, the system button 220) of the region (location, coordinates) corresponding to the user input 500. For example, the electronic device 100 may determine the system button 220 of the location where the user input is detected by the touch detector 133, or a system function by the corresponding system button 220. The electronic device 100 may execute the system function (for example, returning to the home screen) corresponding to the system button 220, and may control to display a screen (for example, the home screen) corresponding the system function (for example, returning to the home screen) through the display 131 as shown in example (B) of FIG. 5.

When it is determined that the user input 500 is the second input, the electronic device 100 may identify an object (for example, a link) of the location where the user input is detected by the touch detector 133. The electronic device 100 may process an application function (for example, executing a web page according to the link) related to the application according to the user input 500. For example, the electronic device 100 may control to recognize the object (for example, the link) of the location where the user input is detected by the touch detector 133, to execute an application-related function (for example, a web page according to the link) associated with the object in response to the user input 500, and to display a screen (for example, another web page screen) corresponding the application-related function (for example, the linked web page) through the display 131 as shown in example (C) of FIG. 5.

According to various embodiments, as shown in FIG. 5, when the execution screen is displayed based on the full screen (example (A) of FIG. 5), and the user input 500 on an object of the execution screen, overlapping the system button of the system button region 200, is detected, the electronic device 100 may distinguish the user input, and may process the system function by means of the system button 210, 220, 230 or the application function by means of the object (for example, a link). For example, when the user input 500 is inputted as the first input (for example, a force touch) on the location overlapping the system button 210, 220, 230, the electronic device 100 may execute the system function based on the system button 210, 220, 230 (for example, example (B) of FIG. 5), and, when the user input 500 is inputted as the second input (for example, a touch), the electronic device 100 may execute an application function based on the object (for example, a link) of the application of the corresponding location (for example, example (C) of FIG. 5).

Figure 6:
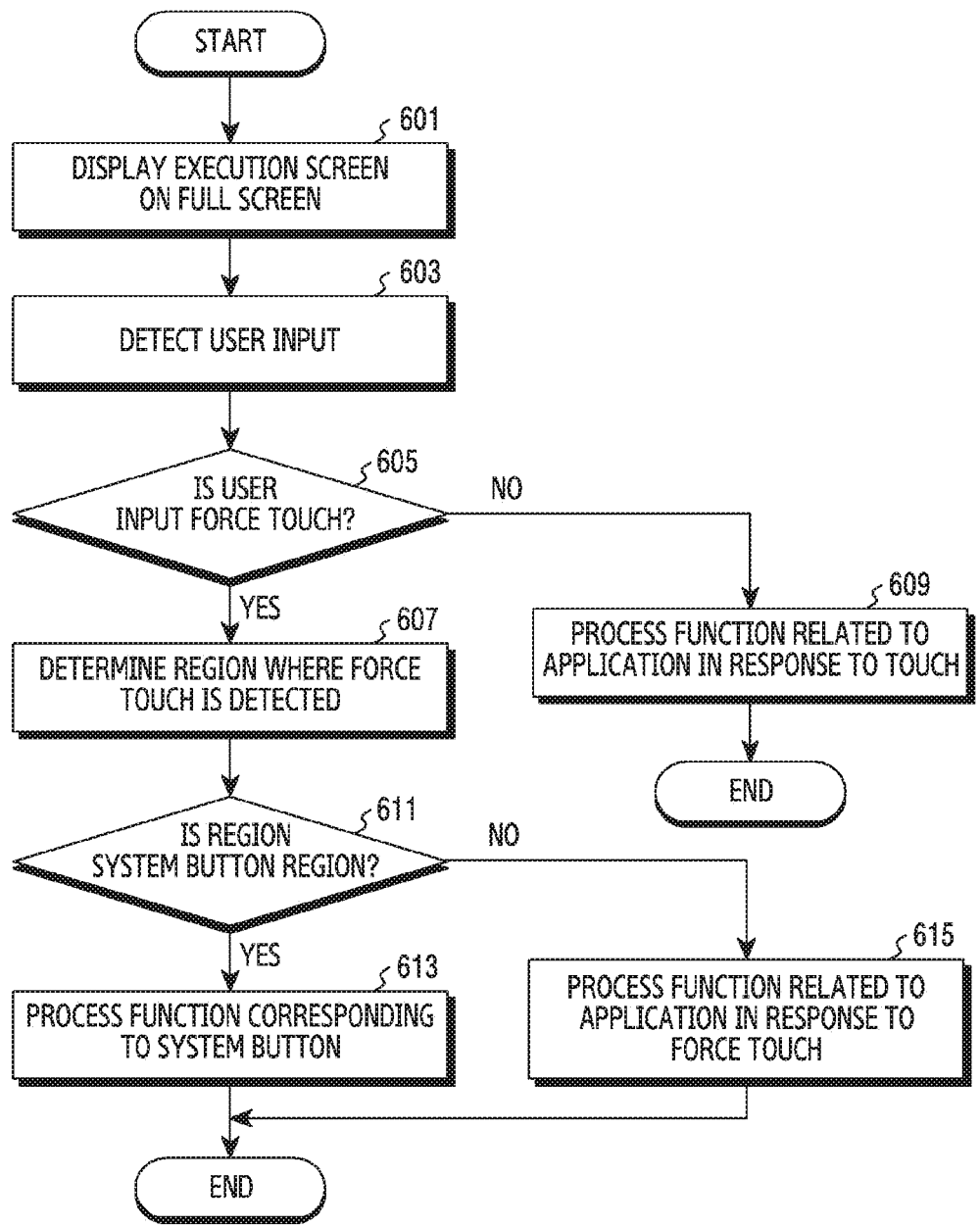
FIG. 6 is a flowchart illustrating an operating method by means of a hidden system button in an electronic device according to various embodiments of the present disclosure.

FIG. 6 is a flowchart illustrating an operating method by a hidden system button in an electronic device according to various embodiments of the present disclosure.

Referring to FIG. 6, in operation 601, the controller 180 (for example, a processor) of the electronic device 100 may display an execution screen of an application on a full screen. For example, the controller 180 may process to display the execution screen of the application through the entire region of the display 131, without displaying the system button 210, 220, 230 through the system button region 200 (for example, by hiding).

In operation 603, the controller 180 may detect a user input. For example, a user may touch or do a force touch on a certain region of the execution screen of the application.

In operation 605, the controller 180 may determine whether the user input is a force touch or a touch. According to various embodiments, when detecting the user input, the controller 180 may determine whether the corresponding user input is inputted as a force touch or a normal touch. According to an embodiment, the controller 180 may detect a first sensing value by the touch detector 133 and then may detect a second sensing value by the force detector 135 according to a user input (for example, a change in the type of input, touch input→force input). The controller 180 may determine the user input as the force touch based on the second sensing value. According to an embodiment, the controller 180 may detect only the first sensing value by the touch detector 133 according to a user input (for example, a touch input, not a force input). When the second sensing value is not detected after the first sensing value is detected, the controller 180 may determine the user input as the normal touch based on the first sensing value.

When it is determined that the user input is a touch in operation 605 (No in operation 605), the controller 180 may process a function related to the application in response to the touch in operation 609. According to an embodiment, when the application is a game, the controller 180 may process a first operation related to a game manipulation in response to the user input. According to an embodiment, when the application is a web page, the controller 180 may process a first operation of toggling to an execution screen of another web page related to a link, and displaying the execution screen in response to the user input. According to an embodiment, when the application is a video play application, the controller 180 may process controlling a first function (for example, pause, volume, stop, list display, fast forward, rewind, replay position designation, etc.) related to playing of a corresponding media file (for example, a video, music, etc.) in response to the user input.

When it is determined that the user input is a force touch in operation 605 (Yes in operation 605), the controller 180 may determine a region where the force touch is detected in operation 607, and may determine whether the region for the force touch corresponds to the system button region 200 in operation 611. For example, the controller 180 may distinguish an input by the system button region 200 and an input by means of another region based on the location on the touch screen 130 that is touched by a user's finger.

When it is determined that the user input is the force touch by means of the system button region 200 in operation 611 (Yes in operation 611), the controller 180 may process a system function corresponding to the corresponding system button 210, 220, or 230 of the system button region 200 in operation 613. According to an embodiment, when a force touch by means of the location of the system button 210 is detected, the controller 180 may execute a recent list viewing function set for the system button 210, and may process displaying a screen corresponding thereto (for example, displaying a list of recently executed applications). According to an embodiment, when a force touch by means of the location of the system button 220 is detected, the controller 180 may execute a home screen returning function set for the system button 220, and may process displaying a screen (for example, the home screen) corresponding thereto. According to an embodiment, when a force touch by means of the location of the system button 230 is detected, the controller 180 may execute a previous screen returning function set for the system button 230, and may process displaying a screen (for example, a previous execution screen or another screen according to exit of the application) corresponding thereto.

When it is determined that the user input is not the force touch by means of the system button region 200 in operation 611 (No in operation 611), that is, the user input is a force touch within the execution screen region of the application, the controller 180 may process a function related to the application in response to the force touch in operation 615. According to an embodiment, the controller 180 may process a function different from the function related to the application, performed based on the touch as described above. According to an embodiment, when the application is a game, the controller 180 may process a second operation rather than the first operation related to a game manipulation in response to the user input (force touch). According to an embodiment, when the application is a web page, the controller 180 may process another second operation (for example, copying a link, etc.), rather than toggling to an execution screen of another web page related to a link, in response to the user input (force touch). According to an embodiment, when the application is a video play application, the controller 180 may process controlling a second function (for example, playing a next list) rather than the first function related to playing of the corresponding media file (for example, a video, music, or the like), in response to the user input (force touch).

Figure 7:
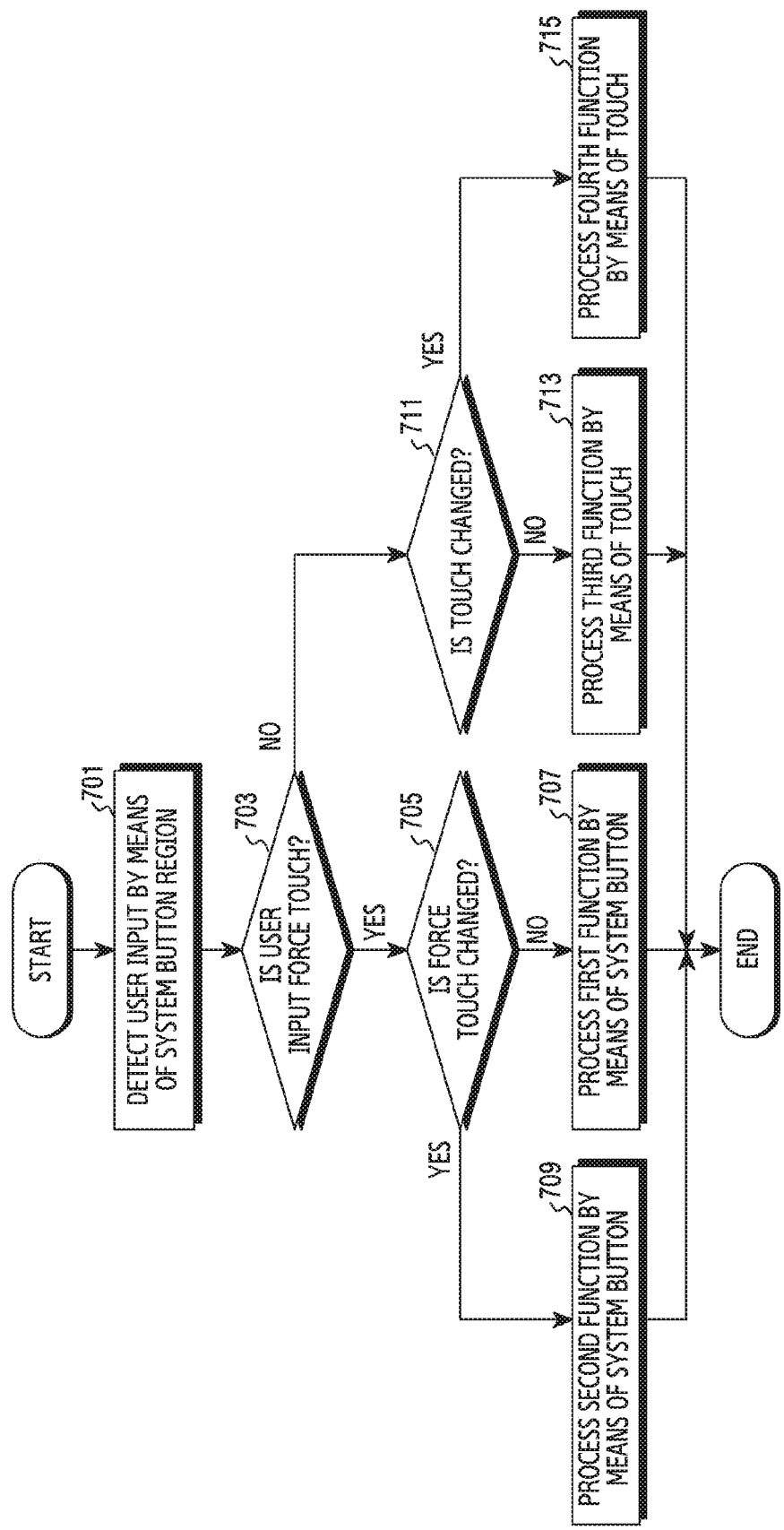
FIG. 7 is a flowchart illustrating a method for processing functions distinguished by distinguishing user inputs in an electronic device according to various embodiments of the present disclosure.

FIG. 7 is a flowchart illustrating a method for processing functions distinguished by distinguishing user inputs in an electronic device according to various embodiments of the present disclosure.

Referring to FIG. 7, in operation 701, the controller 180 (for example, a processor) of the electronic device 100 may detect a user input through the system button region 200. For example, the controller 180 may distinguish an input by means of the system button region 200 and an input by means of another region based on a location on the touch screen 130 that is touched by a user's finger.

In operation 703, the controller 180 may determine whether the user input is a force touch or a touch. According to an embodiment, when the controller 180 detects a first sensing value by the touch detector 133 and then detects a second sensing value by the force detector 135 according to a user input (for example, touch input→force input), the controller 180 may determine the user input as a force touch. According to an embodiment, when the controller 180 detects the first sensing value by the touch detector 133 and then does not detect the second sensing value according to a user input (for example, a touch input, not a force input), the controller 180 may determine the user input as a touch.

When it is determined that the user input is a force touch in operation 703 (Yes in operation 703), the controller 180 may determine whether the force touch is changed in operation 705. For example, the user may input a force touch and then may move the force touch (for example, moving the force touch while holding the force input (for example, a force drag or a force move), or may release the force input and may move a touch input (for example, a drag or a move). Alternatively, the user may input a force touch and then hold the force touch for more than a predetermined time (for example, a long press while holding the force input (for example, a force long press)), or may release the force input and hold a touch input (long press). The controller 180 may determine a change in the force touch as described above until the force touch is released after detecting the force touch.

When the force touch is not changed in operation 705 (No in operation 705) (for example, the force touch is released after being inputted), the controller 180 may process a first function by the corresponding system button in operation 707. It is assumed that the force touch is released right after the force touch is inputted. According to an embodiment, when the system button on which the force touch is detected is the system button 210 for viewing a recent list, the controller 180 may execute the recent list viewing function in response to the force touch. According to an embodiment, when the system button on which the force touch is detected is the system button 220 for returning to the home screen, the controller 180 may execute the home screen returning function in response to the force touch.

When the force touch is changed in operation 705 (Yes in operation 705), the controller 180 may process a second function by a corresponding system button in operation 709. For example, it is assumed that the change in the force touch is the force long press. According to an embodiment, when the system button on which the force touch is detected is the system button 210 for viewing a recent list, the controller 180 may execute a split screen viewing function, which is a second function of the system button 210, rather than the recent list viewing function, in response to the force touch. According to an embodiment, when the system button on which the force touch is detected is the system button 220 for returning to the home screen, the controller 180 may execute a voice recognition function which is a second function of the system button 220, rather than the home screen returning function, in response to the force touch.

When it is determined that the user input is a touch in operation 703 (No in operation 703), the controller 180 may determine whether the touch is changed in operation 711. For example, the user may input the touch and then may move the touch (for example, a drag or a move). Alternatively, the user may input the touch and then may hold the touch for more than a predetermined time (for example, a long press) The controller 180 may determine a change in the touch as described above until the touch is released after the touch is detected.

When the touch is not changed in operation 711 (No in operation 711) (for example, the touch is released after being inputted), the controller 180 may process a third function associated with an application by the touch in operation 713. For example, it is assumed that the touch is released right after the touch is inputted. According to an embodiment, the controller 180 may identify an object rather than the system button in the region where the touch is detected, and may execute a third function corresponding to the object. According to an embodiment, when the object includes a link, the controller 180 may control to display a web page according to the link. According to an embodiment, when the object is a function button (a photographing button), the controller 180 may control to execute a function (for example, photographing) mapped onto the function button.

When the touch is changed in operation 711 (Yes in operation 711), the controller 180 may process a fourth function associated with the application by the touch in operation 715. For example, it is assumed that the change in the touch is the long press. According to an embodiment, the controller 180 may identify an object rather than the system button in the region where the touch is detected, and may execute the fourth function corresponding to the object. According to an embodiment, when the object includes a link, the controller 180 may control to display an additional option menu (for example, opening a link, opening a new page, copying URL, storing), which is the fourth function, in association with the link, rather than executing a web page. According to an embodiment, when the object is a function button, the controller 180 may control to execute the fourth function (for example, continuous shooting) in association with the function button, rather than executing the third function (for example, shooting) mapped onto the function button.

According to various embodiments as described above, when an execution screen is displayed based on a full screen, and a user input on an object of the execution screen overlapping the system button of the system button region 200 is detected, the electronic device may distinguish the user input and may process a system function by the system button or an application function by the object. For example, when the user input is a force touch on an overlapping location of the system button, the electronic device may execute the system function based on the system button, and, when the user input is inputted as a touch, the electronic device may execute an application function based on the object of the application on the corresponding location. In addition, according to various embodiments, the electronic device may distinguish user input methods (for example, whether the input is changed) regarding the force touch and the touch, and may execute different functions in response to the respective inputs (for example, the force touch, the touch) according to the distinguished user input methods. According to an embodiment, the electronic device may operate by distinguishing between the first function and the second function according to the input method of the force touch, and may operate by distinguishing between the third function and the fourth function according to the input method of the touch.

As described above, operating method of the electronic device 100 according to various embodiments may include: displaying an application on a full screen; detecting a user input through a touch region (for example, the system button region 200) comprising a system button 210, 220, 230 on the full screen; identifying the user input; and executing a system function by means of the system button 210, 220, 230 or an application function according to the user input on the touch region comprising the system button 210, 220, 230.

According to various embodiments, identifying the user input may include detecting the user input by means of the touch region on the display, and, in response to the user input on the touch region being detected, determining whether the user input is a first input for the system function or a second input for the application function.

According to various embodiments, executing the function may include comprises, when the user input is the first input, executing the system function corresponding to a system button of a location where the user input is detected, and displaying a relevant screen, and, when the user input is the second input, executing the application function based on an object of the location where the user input is detected, and displaying a relevant screen.

According to various embodiments, identifying the user input may include, when a first sensing value by the touch detector 133 is detected and a second sensing value by the force detector 135 is detected, identifying the user input as the first input based on the second sensing value.

According to various embodiments, identifying the user input may include, when the first sensing value by the touch detector 133 is detected, identifying the user input as the second input based on the first sensing value.

According to various embodiments, the system button may include one or more software buttons to view a recent list, to return to a home screen, or to return to a previous screen, and may be provided on the touch region transparently or translucently.

According to various embodiments, displaying the execution screen may include, in response to execution of the application being detected, determining whether the application is in a mode in which the application operates on the full screen of a display, or in a mode in which the application operates on a partial screen of the display.

According to various embodiments, the operating method of the electronic device may further include showing or hiding the system button based on various inputs.

According to various embodiments, executing the system function may further include: when the user input on the touch region comprising the system button is a force touch, determining to process an operation by means of the system button in response to the user input; and executing another system function by means one system button in response to an input method of the user input on the system button.

According to various embodiments, executing the system function may include: determining whether the force touch is changed; when the force touch is not changed, executing a first function by means of the system button; and, when the force touch is changed, executing a second function by means of the system button.

Various embodiments of the present disclosure disclosed in the specification and the drawings are suggested for easy explanation and understanding of the technical features of the present disclosure, and are not intended to limit the scope of the present disclosure. Therefore, the scope of the present disclosure should be interpreted as including all changes or changed forms derived based on the technical idea of the present disclosure, in addition to embodiments disclosed herein.

What is claimed is:

1. An electronic device comprising:
a display;
a memory; and
a processor electrically connected with the display and the memory,
wherein the processor is configured to:
display a system button in a touch region of the display,
in response to execution of an application based on a full screen mode, display an execution screen of the application without the system button, and
while the execution screen of the application is displayed without displaying the system button:
in response to detection of a user input through the touch region, determine whether the user input corresponds to a first input or a second input based on a sensing value associated with the user input,
in response to a determination that the user input corresponds to the first input, execute a system function by means of the system button, and
in response to a determination that the user input corresponds to the second input, execute an application function according to the user input on the touch region,
wherein the sensing value comprises a first sensing value and a second sensing value, and
when the first sensing value by a touch detector is detected and the second sensing value by a force detector is detected, the processor is configured to identify the user input as the first input based on the second sensing value.

2. The electronic device of claim 1, wherein, when the sensing value by the touch detector is detected, the processor is configured to identify the user input as the second input based on the first sensing value.

3. The electronic device of claim 1, wherein the system button comprises one or more software buttons to view a recent list, to return to a home screen, or to return to a previous screen.

4. The electronic device of claim 1, wherein, in response to the execution of the application being detected, the processor is configured to determine whether the application is in the full screen mode or in a mode in which the application operates on a partial screen of the display.

5. The electronic device of claim 1, wherein the processor is configured to control to show or hide the system button based on various inputs, while the execution screen of the application is displayed.

6. The electronic device of claim 1, wherein, when the user input on the touch region comprising the system button is a force touch, the processor is configured to determine to process an operation by means of the system button in response to the user input, and to execute another system function by means of one system button in response to an input method of the user input on the system button.

7. The electronic device of claim 6, wherein the processor is configured to determine whether the force touch is changed, and, when the force touch is not changed, the processor is configured to execute a first function by means of the system button, and, when the force touch is changed, to execute a second function by means of the system button.

8. An operating method of an electronic device, the method comprising:
displaying a system button in a touch region of a display of the electronic device;
displaying an execution screen of an application without displaying the system button; and
while the execution screen of the application is displayed without displaying the system button:
in response to detection of a user input through the touch region,
determining whether the user input corresponds to a first input or a second input based on a sensing value associated with the user input,
in response to a determination that the user input corresponds to the first input, executing a system function by means of the system button, and in response to a determination that the user input corresponds to the second input, executing an application function according to the user input on the touch region wherein the sensing value comprises a first sensing value and a second sensing value, and wherein identifying the user input comprises:

when the first sensing value by a touch detector is detected and the second sensing value by a force detector is detected, identifying the user input as the first input based on the second sensing value; and when the first sensing value by the touch detector is detected without the second sensing value detected by the force detector, identifying the user input as the second input based on the first sensing value.

9. The operating method of claim 8, wherein displaying the full screen comprises, in response to the execution of the application being detected, determining whether the application is in the full screen mode or in a mode in which the application operates on a partial screen of the display.

10. The operating method of claim 8, wherein executing the system function comprises:

when the user input on the touch region comprising the system button is a force touch, determining to process an operation by means of the system button in response to the user input; and executing another system function by means one system button in response to an input method of the user input on the system button, and wherein executing another system function comprises:

determining whether the force touch is changed;

when the force touch is not changed, executing a first function by means of the system button; and when the force touch is changed, executing a second function by means of the system button.

\* \* \* \* \*